United States Patent
Tsuda

[11] Patent Number: 5,871,601
[45] Date of Patent: Feb. 16, 1999

[54] PNEUMATIC RADIAL TIRE WITH LOAD BEARING RUBBER REINFORCING LAYER

[75] Inventor: Toru Tsuda, Tokyo, Japan

[73] Assignee: Bridgestone Corporation, Tokyo, Japan

[21] Appl. No.: 793,648

[22] PCT Filed: Jun. 10, 1996

[86] PCT No.: PCT/JP96/01568

§ 371 Date: Jul. 14, 1997

§ 102(e) Date: Jul. 14, 1997

[87] PCT Pub. No.: WO97/01452

PCT Pub. Date: Jan. 16, 1997

[30] Foreign Application Priority Data

Jun. 26, 1995 [JP] Japan .................................. 7-159280

[51] Int. Cl.$^6$ ............... B60C 9/18; B60C 9/20; B60C 13/00; B60C 17/00
[52] U.S. Cl. .......... 152/517; 152/527; 152/531; 152/533; 152/534; 152/535; 152/536
[58] Field of Search .................... 152/517, 527, 152/531, 534–536, 533

[56] References Cited

U.S. PATENT DOCUMENTS 5,427,176  6/1995  Hayashi et al. ..................... 152/517

FOREIGN PATENT DOCUMENTS

| 2425334 | 12/1979 | France | .................................. 152/517 |
| 2-147417 | 6/1990 | Japan . | |
| 2-283508 | 11/1990 | Japan . | |

*Primary Examiner*—Adrienne Johnstone
*Attorney, Agent, or Firm*—Sughrue, Mion, Zinn, Macpeak & Seas, PLLC

[57] ABSTRACT

A radial pneumatic tire having excellent run-flat durability. The tire is equipped with a belt (4), which includes a plurality of metal cord layers, and a tread (5) successively placed at a periphery of a crown portion (3) of a toroidal radial carcass (2), and is equipped with, at an inner peripheral surface of the side portion (6) of the carcass, a rubber reinforcing layer (7) having a crescent moon shaped cross-section and bearing and supporting load. The tire has an auxiliary belt (8) disposed between the carcass and the belt and including organic fiber cords which are oriented substantially cross to the cords of the carcass and the cords of the belt with respect to a central equatorial plane, the cords of the auxiliary belt substantially crossing the central equatorial plane.

7 Claims, 1 Drawing Sheet

FIG. 2
CONVENTIONAL
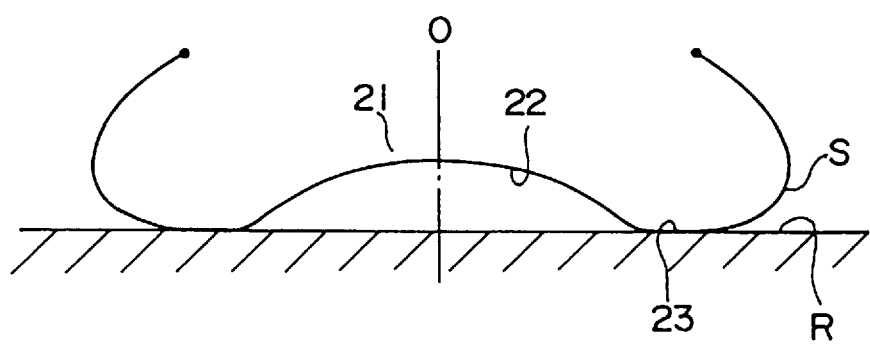

PNEUMATIC RADIAL TIRE WITH LOAD BEARING RUBBER REINFORCING LAYER

TECHNICAL FIELD

The present invention relates to a pneumatic radial tire, and more specifically, to a pneumatic radial tire which is strengthened by providing, at the sidewall of the tire, a rubber reinforcing layer having a crescent moon shaped cross-section, such that when the pneumatic tire installed on a vehicle is punctured during running, the tire can run for a considerable distance in the punctured state.

BACKGROUND ART

Conventionally, various measures have been devised for safely continuing running, without damaging the tire further and without disadvantages such as poor steering. This occurs over a distance from the place where the tire was punctured to a place desired by the driver, e.g., a service station where the tire can be changed, at the time when the internal pressure decreases or becomes zero (hereinafter, "punctured") for some reason, and in many cases, due to a foreign object such as a nail or a metal piece piercing the tire, during traveling of the pneumatic tire installed on a vehicle.

Among these measures, as a simple and effective measure for radial tires for passenger vehicles in particular, Japanese Patent Application Publication No. 52-41521 discloses art relating to a so-called side reinforced run-flat tire in which a rubber reinforcing layer having a crescent moon shaped crosssection is made to line the carcass inner peripheral surface of the sidewall, which is the region in the tire having the lowest rigidity, so that the entire sidewall has approximately the same thickness and so as to provide rigidity.

In this side reinforced run-flat tire, in an ordinary state, the load is mainly supported by internal pressure. When the tire is punctured, the supporting of the load is taken over by the rigidity inherent in the reinforced sidewall.

However, in this side reinforced run-flat tire, as illustrated in FIG. 2, when the tire is punctured, buckling of a sidewall S is avoided, but a crown portion 21 exhibits the phenomenon known as buckling, and a tread 22 is thereby lifted up from a road surface R. As a result, a portion 23 of the sidewall separated from the tread 22 contacts the ground.

In this ground-contacting state, obviously, stress concentrates and defects arise at an early stage at portions at which there is much bending deformation. As a result, in order to increase the durability of the run-flat tire, buckling of the crown portion 21 must be suppressed, and tire deformation must, as much as possible, be maintained the same as before the puncture.

Japanese Patent Application Laid-Open No. 6-191243 and Japanese Patent Application Laid-Open No. 6-191244 disclose techniques in which at least one organic fiber cord layer, which is effective for weight reduction, is disposed at the outer periphery of the belt layer, so as to increase the rigidity of the tread base portion.

However, these disclosed techniques do not exhibit sufficient effects for suppressing buckling, and the current situation is that, even if the rigidity of the tread base portion is increased even more, by winding a plurality of layers, the effects are small in proportion to the increase in cost and in weight.

DISCLOSURE OF THE INVENTION

The present invention has taken into consideration the above-described problematic points, and an object thereof is to provide a pneumatic tire in which, when the tire is punctured, buckling of the crown portion is suppressed, and durability is increased.

The present invention is a pneumatic radial tire equipped with a belt, which includes a plurality of metal cord layers, and a tread successively placed on a crown portion periphery of a toroidal radial carcass, and equipped with, at a side portion inner peripheral surface of the carcass, a rubber reinforcing layer having a crescent moon shaped cross-section and bearing and supporting load, comprising: an auxiliary belt disposed between the carcass and the belt and including organic fiber cords which are oriented to substantially cross the cords of the carcass and the cords of the belt with respect to a central equatorial plane, the cords of the auxiliary belt substantially crossing the central equatorial plane As is known, a belt for improving the rigidity of the base portion of the tread is provided at the crown portion of a radial tire. The belt is usually formed by a plurality of steel cord layers. It is known that when, due to a puncture, the tread receives bending deformation to rise up, the steel cord belt becomes a neutral axis, a compressive force is applied to the tread and tension is applied to the carcass.

Accordingly, in a conventional reinforcing method in which the outer periphery of the belt is additionally reinforced, the compression side is reinforced, and the intrinsic tensile direction high elasticity of the reinforcing cord is not generated.

The present invention is equipped with an auxiliary belt at the side of the crown portion of the tire to which side tension is applied at the time of a puncture. Accordingly, even if the cords are reinforced by flexible organic fibers, the crown portion is effectively provided with flexural rigidity, and rising up of the tread at the time of a puncture can be effectively suppressed. As a result, local concentration of stress can be avoided, and the run-flat running can be greatly improved. In this case, it is preferable that the cords of the auxiliary belt cross the central equatorial plane at an angle of greater than or equal to 30°, because at angles of less than 30° with respect to the central equatorial plane, sufficient tire radial direction rigidity cannot be obtained and buckling cannot be suppressed. It is even more preferable that the cords of the auxiliary belt are in a range of 45° to 75° with respect to the central equatorial plane. It has been confirmed that, in order to sufficiently and effectively suppress buckling, there must be sufficient tire radial direction rigidity, and circumferential direction rigidity must be maintained, and the angle with respect to the equatorial plane is optimally in a range of 45° to 75°.

Other than aramid, polyester, rayon, and the like can be optimally used for the organic fiber cords. Further, the number of organic fiber cord layers is not limited to one, and plural layers may be superimposed such that the cords thereof cross each other.

BRIEF DESCRIPTION OF THE DRAWINGS

FIG. 2 is a cross-sectional contour view illustrating deformation at the time a tire is punctured in accordance with a conventional art.

PREFERABLE EMBODIMENT FOR IMPLEMENTING THE INVENTION

Figure 1:
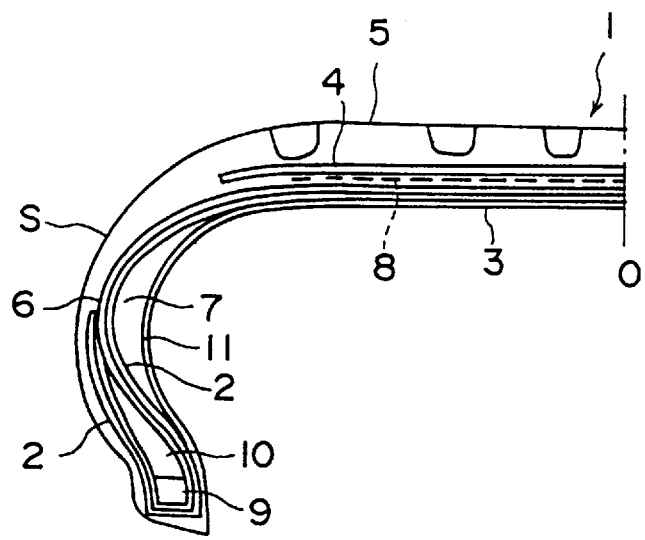
FIG. 1 is a tire cross-sectional view of an embodiment to which the present invention is applied.

In order to confirm the effects of a tire to which the present invention was applied, run-flat durability due to actual running on a vehicle was evaluated for 205/65R15 size Example tires and Conventional Example tires.

For the test method, each test tire was assembled to a 15×5½J rim. After internal pressure was filled so that the bead fit the rim, the valve core was removed, and the test tires having an internal pressure of substantially zero were respectively installed on the front right wheel of a passenger vehicle. The tires were run on a test track at a constant speed of 20 km/h. The driver sensed the generation of abnormal vibrations caused by a defect of the test tire (the limit of durability), and the running distance until the defect was generated was measured.

EXAMPLE 1

Hereinafter, a description will be given on the basis of the drawing. FIG. 1 is a cross-sectional view of a tire illustrating an embodiment of the present invention.

FIG. 1 is an example of a 205/65R15 size passenger vehicle tire (1). A carcass 2 is formed from two plies in which 1000d/2 polyester cords are disposed so as to be oriented substantially orthogonally to an equatorial plane O. Both end portions of the carcass 2 are wound up around bead rings 9 so as to form wound-up end portions 2'. A hard rubber bead filler 10 is embedded taperingly between the carcass 2 above the bead ring and the ply wound-up end portion 2' thereof.

At a side portion 6 inner peripheral surface of the carcass 2, a rubber reinforcing layer 7 (Shore A hardness 84°, maximum width 10 mm) having a crescent moon shaped cross-section is disposed such that the entire sidewall S has a substantially uniform thickness from the position where the rubber reinforcing layer 7 is superposed on the bead filler via the carcass. Reference numeral 5 is a tread and reference numeral 11 is an air-impermeable inner liner.

A belt 4 comprises two layers, each layer being a structure in which 1×5 twisted steel cords are disposed to be inclined at an angle of 26° with respect to the equatorial plane O, and the two layers are superimposed such that the cords cross one another. An auxiliary belt 8 which is narrower than the belt is disposed between the belt 4 and the crown portions 3 of the carcass 2.

In Example 1, the auxiliary belt 8 is disposed between the carcass 2 and the belt 4 and comprises organic fiber cords which are oriented to substantially cross the cords of the carcass and the cords of the belt with respect to the central equatorial plane O. The auxiliary belt 8 is formed by one rubber-coated layer in which 1670d/2 aramid cords are disposed at an angle of 20° with respect to the equatorial plane O.

The belt may be a structure strengthened by a cap belt which is formed for example by lining up a plurality of heat shrinking cords such as nylon or the like in a rubber coated strip and winding the cords spirally in the peripheral direction at the entire periphery or a predetermined region of the periphery of the belt layer.

Although the details of the half at the right side of the equatorial plane O are omitted from FIG. 1, there is symmetry to the left and the right.

EXAMPLE 2

In Example 2, the auxiliary belt 8 of Example 1 is formed from one rubber-coated layer in which aramid cords are disposed at an angle of 30° with respect to the equatorial plane O. Example 2 is substantially similar to Example 1 in all other respects.

EXAMPLE 3

In Example 3, the auxiliary belt 8 of Example 1 is formed from one rubber-coated layer in which aramid cords are disposed at an angle of 45° with respect to the equatorial plane O. Example 3 is substantially similar to Example 1 in all other respects.

EXAMPLE 4

In Example 4, the auxiliary belt 8 of Example 1 is formed from one rubber-coated layer in which aramid cords are disposed at an angle of 60° with respect to the equatorial plane O. Example 4 is substantially similar to Example 1 in all other respects.

EXAMPLE 5

In Example 5, the auxiliary belt 8 of Example 1 is formed from one rubber-coated layer in which aramid cords are disposed at an angle of 75° with respect to the equatorial plane O. Example 5 is substantially similar to Example 1 in all other respects.

EXAMPLE 6

In Example 6, the auxiliary belt 8 of Example 1 is formed from one rubber-coated layer in which aramide cords are disposed at an angle of 90° with respect to the equatorial plane O. Example 6 is substantially similar to Example 1 in all other respects.

COMPARATIVE EXAMPLE 1

In Comparative Example 1, one layer of the same structure as the auxiliary belt 8 is disposed between the belt and the tread. The auxiliary belt 8 is formed from one rubber-coated layer in which aramid cords are disposed at an angle of 60° with respect to the equatorial plane O. Comparative Example 1 is substantially similar to Example 1 in all other respects.

COMPARATIVE EXAMPLE 2

Comparative Example 2 is substantially similar to Example 1 except that no additional cord layer such as the auxiliary belt 8 is used.

The results of measurement of the running distances until defects occurred are listed in the following table.

|  |  | Examples | | | | | | Comparative Examples | |
|---|---|---|---|---|---|---|---|---|---|
|  |  | 1 | 2 | 3 | 4 | 5 | 6 | 1 | 2 |
| Organic Fiber Auxiliary Belt | Exists? | Yes | | | | | | Yes | No |
|  | Placed | Between carcass and belt | | | | | | Between belt and tread | — |
|  | Number of Layers | 1 layer | | | | | | 1 layer | — |
|  | Angle | 20° | 30° | 45° | 60° | 75° | 90° | 60° | — |
| Running Distance until Defect (km) |  | 5 | 7 | 10 | 15 | 12 | 9 | 3 | 2 |

In this way, run-flat durability can be advantageously improved by placing between the carcass and the belt an auxiliary belt including organic fiber cords which are oriented to substantially cross the cords of the carcass and the cords of the belt with respect to the central equatorial plane the cords of the auxiliary belt substantially crossing the central equatorial plane, in a tire having, at the side portion inner peripheral surface of the radial carcass, a rubber reinforcing layer which has a crescent moon shaped cross-section and bears and supports the load.

PRACTICAL USE OF THE INVENTION IN THE INDUSTRY

As described above, the pneumatic radial tire relating to the present invention is useful for use as a tire for a vehicle, and in particular, the pneumatic radial tire which can run for a long distance even if punctured is extremely useful to the automotive industry in today's vehicle-oriented society.

I claim:

1. A pneumatic radial tire comprising; a toroidal radial carcass, a pair of sidewalls, a belt which includes a plurality of metal cord layers and a tread successively placed on a crown portion periphery of said toroidal radial carcass, at each side portion inner peripheral surface of the carcass a rubber reinforcing layer having a crescent moon shaped cross-section and bearing and supporting load, and an auxiliary belt disposed between the toroidal radial carcass and the belt and including organic fiber cords, said cords oriented to substantially cross the radial cords of the carcass and the cords of the belt with respect to a central equatorial plane, the cords of the auxiliary belt substantially crossing the central equatorial plane.

2. A pneumatic radial tire according to claim 1, wherein the cords of said auxiliary belt cross the central equatorial plane at an angle of greater than or equal to 30°.

3. A pneumatic radial tire according to claim 1, wherein said rubber reinforcing layers each have a cross-sectional shape such that both sidewalls of said tire have a substantially uniform thickness.

4. A pneumatic radial tire according to claim 1, wherein said auxiliary belt is a single layer of rubber coated aramid cords.

5. A pneumatic radial tire according to claim 1 further comprising a cap belt positioned radially outside said belt.

6. A pneumatic radial tire according to claim 5, wherein said cap belt is formed by winding a plurality of heat shrinking cords in a rubber coated strip spirally in the peripheral direction at the entire periphery or a predetermined region of the periphery of the belt.

7. A pneumatic radial tire according to claim 1, wherein said auxiliary belt has a width narrower than that of said belt.

* * * * *

UNITED STATES PATENT AND TRADEMARK OFFICE
CERTIFICATE OF CORRRECTION

PATENT NO. : 5,871,601
DATED : February 16, 1999
INVENTOR(S) : Toru Tsuda It is certified that error appears in the above-identified patent and that said Letters Patent is hereby corrected as shown below:

On the title page, add the following under item [56]:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | EP | 0 | 6 | 0 | 5 | 1 | 7 | 7 | 07/06/94 | Europe | | | |
| | | | | | | | | | | | | | |

Signed and Sealed this

Twenty-sixth Day of October, 1999

Attest:

Attesting Officer

Q. TODD DICKINSON

Acting Commissioner of Patents and Trademarks